May 30, 1933.  A. J. MEYER  1,911,917
INTERNAL COMBUSTION ENGINE
Filed April 5, 1930
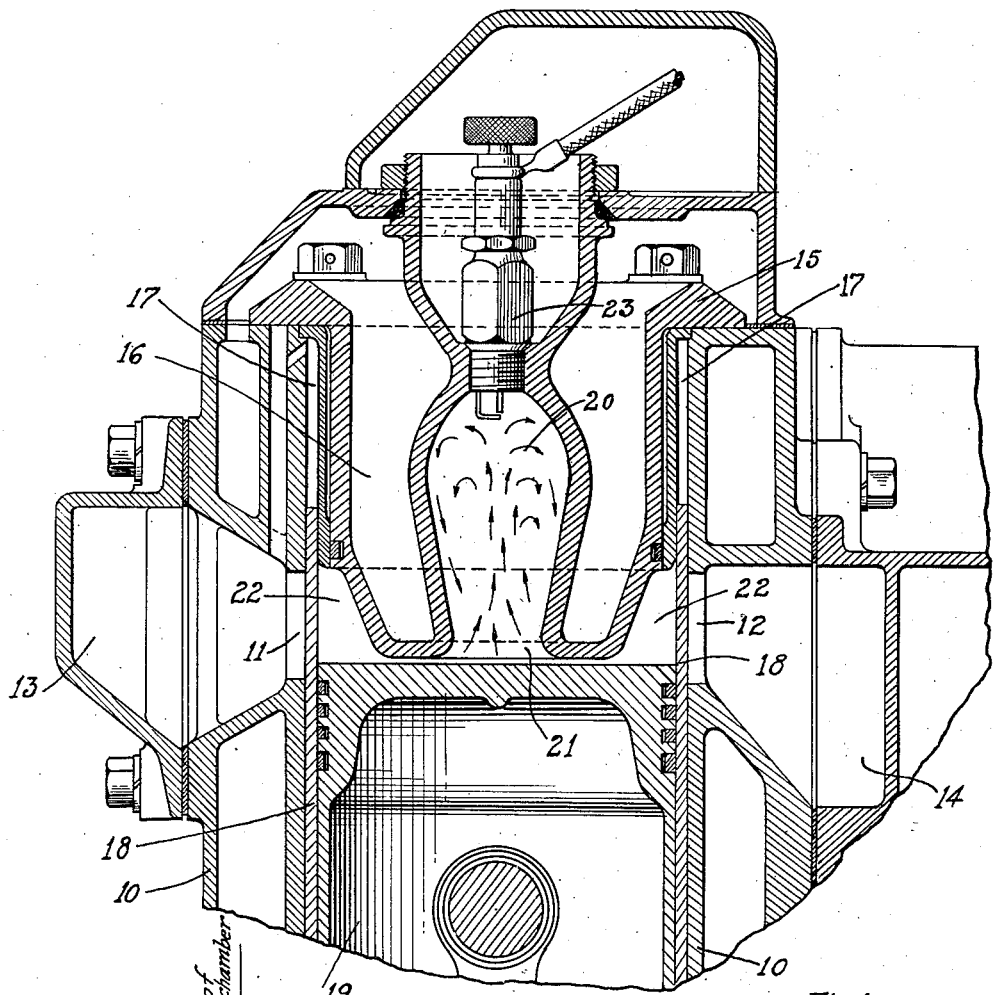
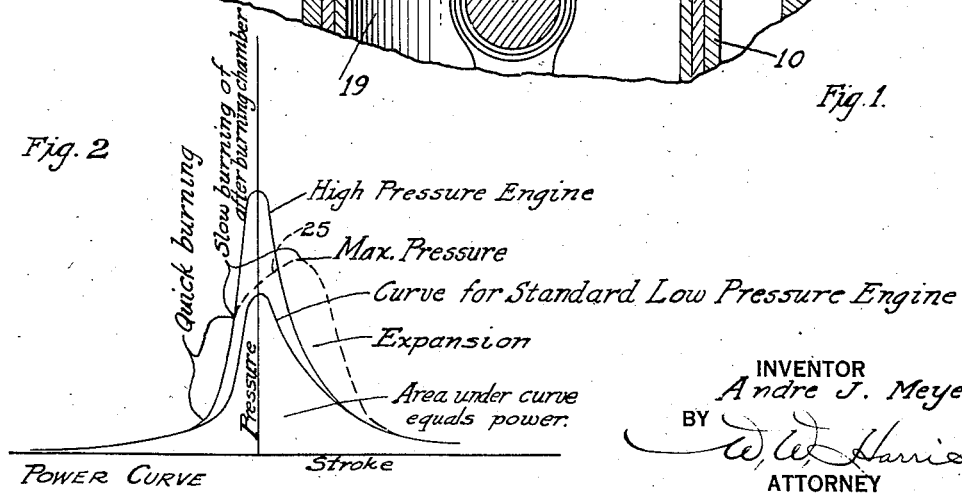
INVENTOR
Andre J. Meyer.
BY
ATTORNEY Patented May 30, 1933

1,911,917

UNITED STATES PATENT OFFICE

ANDRE J. MEYER, OF DETROIT, MICHIGAN, ASSIGNOR TO CONTINENTAL MOTORS CORPORATION, OF DETROIT, MICHIGAN, A CORPORATION OF VIRGINIA

INTERNAL COMBUSTION ENGINE

Application filed April 5, 1930. Serial No. 441,767.

My invention relates to internal combustion engines and more particularly to the construction of a combustion chamber especially adapted for use with an engine of the sleeve valve type, though obviously the principles of my invention may be incorporated in engines other than sleeve valve engines.

Engineers engaged in the development of internal combustion engines are constantly striving to increase engine efficiency by developing engines of maximum power. Of recent years, it has been found that increased power may be obtained by facilitating the combustion of the fuel. Various ways and means have been devised for accomplishing this result, one way being to increase the turbulence within the combustion chamber by providing a restricted opening between the combustion chamber and the cylinder, the fuel being taken in and exhausted from the combustion chamber. One difficulty with this means is that the size of the restricted opening is necessarily controlled by the volume of fuel flowing through the opening since the opening must be of sufficient size to permit a sufficient charge of fuel to be drawn into the cylinder. An opening, which is too small, will prevent the drawing in of a sufficient charge of fuel and will tend to prevent the quick exhaust of the products of combustion. A smaller opening will produce greater turbulence within certain limits of course, but because the opening is usually dependent or otherwise closely associated with the engine intake or exhaust means, the size of the opening is limited and held to a dimension greater than that which would produce the maximum turbulence and the most efficient combustion.

It is the object of my invention to produce an internal combustion engine of maximum efficiency and power by providing a combustion chamber structure therefor in which a maximum of turbulence is imparted to the fuel mixture.

A further object of my invention is to facilitate engine performance by providing an improved means for burning the fuel in the combustion chamber of an internal combustion engine, thereby obtaining the maximum power with a minimum of fuel consumption.

A still further object of my invention is to facilitate the performance of a sleeve valve internal combustion engine by incorporation therewith an improved combustion chamber in which a maximum of power is developed, the fuel is more completely and efficiently burned, and in which the fuel and products of combustion may freely enter or exhaust from the cylinder.

For a more detailed understanding of my invention, reference may be had to the accompanying drawing which illustrates one form which my invention may assume, and in which:

Fig. 1 is a vertical transverse sectional view of an internal combustion engine of the sleeve valve type constructed in accordance with my invention, and Fig. 2 is a diagrammatic view of the power curve of an engine constructed in accordance with my invention compared to the power curves developed by other types of engines.

An internal combustion engine of the sleeve valve type is illustrated in the accompanying drawing and comprises a cylinder 10 provided with the usual intake and exhaust ports 11 and 12 communicating with the usual intake and exhaust manifolds 13 and 14 respectively. A cylinder head structure 15 is associated with the cylinder and is provided with a portion 16 depending within and spaced from the cylinder wall to provide a sleeve pocket 17 for receiving the upper end of sleeve valve means 18. A piston 19 is operatively reciprocated in the cylinder. The cylinder head and cylinder are preferably provided with the usual jackets through which a cooling medium is circulated.

The engine illustrated is the well known single sleeve valve type wherein the sleeve valve 18 is driven with a combined oscillating and reciprocating movement. Any desired manner of driving the sleeve valve may be employed such as disclosed in the patent to Burt No. 1,310,646 issued July 22, 1919. I have not illustrated the sleeve valve ports for intake and exhaust as these are well known in construction and operation. The said Burt patent, for example, discloses an arrangement of sleeve valve porting adaptable to my sleeve valve 18.

My cylinder head is constructed with a primary combustion chamber 20, which is located above a central portion of the cylinder and is provided with an opening 21 through which communication may be had to the interior of the cylinder. Means are provided for restricting the opening 21 and this is preferably accomplished by constructing the opening of less diameter than the diameter of the body portion of the combustion chamber. A secondary combustion chamber, usually referred to as an afterburning combustion chamber is provided, and comprises an annular circumferential recess 22, which is spaced from the opening 21 and preferably concentrically located therewith. This annular afterburning combustion chamber is shown as being located adjacent the cylinder wall. The bottom face portion of the cylinder head intermediate the opening 21 and the annular afterburning combustion chamber 22 is so constructed as to have a minimum clearance with respect to top face of the piston, when the piston is at top dead center.

The engine is operated on the usual 4 cycle principle, the fuel being drawn into the cylinder during the intake stroke, after which the fuel is compressed. The fuel is caused to flow through the restricted opening 21 into the primary combustion chamber and also squeezed from out the rather restricted portion of the chamber lying between the piston face and the annular intermediate portion of the head. The construction of this combustion chamber is such that a maximum of turbulence is imparted to the compressed fuel. The spark plug 23 is located adjacent the top of the primary combustion chamber and the fuel adjacent thereto is consequently fired first. The flame travels downwardly through the primary combustion chamber 20 and then radially outwardly to the afterburning chamber 22. Thus, that portion of the combustion chamber in which the fuel is subjected to the greatest pressure (in the secondary chamber 22) is also subjected to the greatest amount of cooling, thereby preventing pre-ignition of the fuel in the secondary chamber. Thus my construction provides a combustion chamber in which the fuel is more efficiently burned, thereby utilizing the maximum amount of the fuel in doing useful work by effecting a complete and efficient combustion of the fuel. Increased power is thus obtained with a corresponding economy of fuel consumption.

It will be noted that the intake and exhaust ports communicate directly with the cylinder, and the fuel is introduced in the cylinder and the products of combustion are exhausted therefrom independently of the restricted opening into the primary combustion chamber. Consequently the opening 21 may be constructed of a size and shape that will produce a maximum amount of turbulence of the fuel in the said primary combustion chamber. Thus the size of the opening 21 is controlled by only one factor and is not limited by the limitations imposed upon the intake and exhaust ports. The intake and exhaust ports may be constructed to permit a free flow of the fuel into the cylinder and to permit a quick and free exhaust of the products of combustion.

In Fig. 2 the relative power output of my engine is graphically compared with a low pressure engine and a high pressure engine. A quick burning of the fuel is obtained in the primary combustion chamber 20 and the resulting pressure mounts rapidly. After the total charge of fuel is partially burned; that is, the fuel within the primary combustion chamber, the remaining fuel in the secondary or afterburning chamber 22 is more slowly burned resulting in an increase of pressure as graphically illustrated by the dotted line 25 until the fuel is completely burned at which time, the point of maximum pressure is reached. The pressure is reduced as expansion takes place, the energy being thus used to do useful work. The power is graphically represented by the area under the curves shown in Fig. 2 and it will be noted that an engine constructed in accordance with my invention produces at least as much power if not more than a high pressure engine, and my engine is not subjected to the disadvantages of the high pressure engines such as roughness caused by the rapidity of pressure rise. The maximum compression ratio is limited by this tendency to produce roughness. By incorporating an afterburning combustion chamber the tendency of roughness is reduced. Consequently, a higher compression ratio is permissible with this type of engine and therefore a higher power output may be realized with such an engine. The graphic curves shown in Fig. 2 are merely approximate and are shown primarily to illustrate in a general way the relative advantages to be obtained with the use of this improved combustion chamber.

Although I have illustrated but one form of my invention and have described in detail but a single application thereof, it will be apparent to those skilled in the art to which my invention pertains that various modifications and changes may be made therein without departing from the spirit of my invention or from the scope of the appended claims.

What I claim as my invention is:

1. In an internal combustion engine, a cylinder ported for intake and exhaust, valve means for said intake and exhaust ports, and a cylinder head having a primary combustion chamber communicating with and located above the central portion of the cylinder, said head provided with an annular afterburning combustion chamber substantially surrounding said primary combustion chamber located adjacent the wall of the cylinder and having its greatest height adjacent the cylinder wall.

2. In an internal combustion engine, a cylinder ported for intake and exhaust, valve means for said intake and exhaust ports, and a cylinder head having a primary combustion chamber above the central portion of the cylinder, said combustion chamber provided with an opening axially aligned with the cylinder axis and having a diameter less than that of the cylinder for the purpose of providing communicating means between the cylinder and combustion chamber, said head provided with an annular afterburning combustion chamber spaced from and concentrically arranged about the opening of said combustion chamber said afterburning chamber constructed to provide a maximum of cooling for the fuel mixture last to burn.

3. In an internal combustion engine, a cylinder ported for intake and exhaust, valve means for said intake and exhaust ports, a piston operating in said cylinder, and a cylinder head having a primary combustion chamber located above the central portion of the cylinder, said combustion chamber provided with an opening axially aligned with the cylinder axis and having a diameter less than that of the cylinder for providing communicating means between the cylinder and combustion chamber, said cylinder head provided with an annular afterburning combustion chamber bounded by the cylinder wall and spaced from and concentrically surrounding the opening of said combustion chamber, the bottom surface of said cylinder head intermediate the opening of said primary combustion chamber and the annular afterburning combustion chamber having a minimum clearance with respect to the top face of the piston when the piston is at top dead center.

4. In an internal combustion engine of the sleeve valve type, a cylinder ported for intake and exhaust, sleeve valve means associated with the cylinder and having a combined reciprocating and oscillating movement with respect to the cylinder and sleeve axes whereby any point on the sleeve traverses a closed path, and a cylinder head constructed to provide a pocket structure for receiving the upper end of said sleeve valve means and provided with radially spaced primary and secondary combustion chambers, said primary combustion chamber having a restricted opening through which communication may be had to the interior of the cylinder and substantially surrounded by said secondary chamber, said opening being independent from said cylinder intake and exhaust means.

5. In an internal combustion engine of the sleeve valve type, a cylinder ported for intake and exhaust, sleeve valve means associated with the cylinder, and a cylinder head depending within and spaced from the wall of the cylinder to provide a sleeve pocket structure for receiving the upper end of said sleeve valve means, said cylinder head structure provided with a primary combustion chamber located above and communicating with the central portion of the cylinder and an annular afterburning combustion chamber extending circumferentially solely above the lowermost portion of the cylinder head adjacent the cylinder wall and substantially encircling said primary combustion chamber.

6. In an internal combustion engine of the sleeve valve type, a cylinder ported for intake and exhaust, sleeve valve means associated with the cylinder, and a cylinder head depending within and spaced from the wall of the cylinder to provide a sleeve pocket structure for receiving the upper end of said sleeve valve means, said cylinder head structure provided with a primary combustion chamber located above the central portion of the cylinder, said combustion chamber having a restricted opening communicating with the interior of the cylinder, said cylinder head additionally provided with an annular afterburning combustion chamber substantially encircling the depending portion of the cylinder head adjacent the cylinder wall and bounded outwardly by said cylinder wall.

7. In an internal combustion engine of the sleeve valve type, a cylinder ported for intake and exhaust, sleeve valve means associated with the cylinder, and a cylinder head structure depending within and spaced from the wall of the cylinder to provide a sleeve pocket structure for receiving the upper end of said sleeve valve means, a piston operating in said cylinder, said cylinder head provided with a primary combustion chamber located above the central portion of the cylinder, said primary combustion chamber provided with a restricted opening through which communication may be had to the interior of the cylinder, said cylinder head further provided with an annular afterburning combustion chamber circumferentially substantially surrounding the depending cylinder head portion adjacent the cylinder wall and spaced from the opening of said primary combustion chamber, the bottom surface of said cylinder head intermediate the opening of said primary combustion chamber and the annular afterburning combustion chamber having a minimum clearance with respect to the top face of the piston when the piston is at top dead center, said annular afterburning chamber being bounded by said cylinder wall.

8. In an internal combustion engine of the sleeve valve type, a cylinder ported for intake and exhaust, sleeve valve means having intake and exhaust ports cooperating with said cylinder intake and exhaust ports, a piston operating within said cylinder, a cylinder head having a primary combustion chamber communicating with said cylinder, said cylinder head and piston constructed and cooperating together to provide an annular afterburning chamber substantially circumferentially surrounding said primary chamber within the boundaries as defined by the cylinder wall, said cylinder wall forming the outer wall of said afterburning chamber and extending at least the full height of said afterburning chamber.

9. In an internal combustion engine of the sleeve valve type, a cylinder ported for intake and exhaust, sleeve valve means having intake and exhaust ports cooperating with said cylinder intake and exhaust ports, a piston operating within said cylinder, a cylinder head having a primary combustion chamber communicating with said cylinder, said cylinder head and piston constructed and cooperating together to provide an annular afterburning chamber lying substantially in a horizontal plane through the engine containing the cylinder intake and exhaust ports and substantially surrounding the primary combustion chamber, said cylinder wall forming the outer wall of the afterburning chamber having a height approximating that of said afterburning chamber.

10. In an internal combustion engine of the sleeve valve type, a cylinder ported for intake and exhaust, a sleeve valve means having intake and exhaust ports cooperating with said cylinder intake and exhaust ports, a piston operating within said cylinder, a cylinder head having a primary combustion chamber communicating with said cylinder, said cylinder head and piston constructed and cooperating together to provide an annular afterburning chamber substantially surrounding the primary chamber and extending to a point substantially adjacent to the innermost edge of said cylinder intake and exhaust ports when the piston is at its outermost limit of travel.

11. In an internal combustion engine of the sleeve valve type, a cylinder ported for intake and exhaust, sleeve valve means having intake and exhaust ports cooperating with said cylinder intake and exhaust ports, a piston operating within said cylinder, a cylinder head having a primary combustion chamber communicating with said cylinder, said cylinder head and piston constructed and cooperating together to provide an annular afterburning chamber substantially surrounding the primary chamber substantially triangular in cross-section, the piston and cylinder wall respectively forming a bottom and outer side wall for said afterburning chamber, said cylinder head forming an inner side wall spaced radially inwardly from the cylinder intake port and positioned substantially in the horizontal plane through the engine containing said cylinder intake port.

12. In an internal combustion engine of the sleeve valve type, a chamber ported for intake and exhaust, sleeve valve means having intake and exhaust ports cooperating with said cylinder intake and exhaust ports, a piston operating within said cylinder, a cylinder head having a primary combustion chamber communicating with said cylinder, said cylinder head and piston constructed and cooperating together to provide an annular afterburning chamber substantially circumferentially surrounding the primary chamber and located adjacent to and radially inwardly of the cylinder wall, said afterburning chamber having its maximum height adjacent the cylinder wall.

13. In an internal combustion engine of the sleeve valve type, a cylinder ported for intake and exhaust, sleeve valve means having intake and exhaust ports cooperating with said cylinder intake and exhaust ports, a piston operating within said cylinder, a cylinder head having a primary combustion chamber communicating with said cylinder, said cylinder head and piston constructed and cooperating together to provide an annular afterburning chamber substantially concentrically circumferentially surrounding said primary chamber within the boundaries as defined by the cylinder wall, a portion of said cylinder wall forming a bounding wall of said afterburning chamber extending substantially the full height thereof.

14. In an internal combustion engine of the sleeve valve type, a cylinder ported for intake and exhaust, sleeve valve means having intake and exhaust ports cooperating with said cylinder intake and exhaust ports, a piston operating within said cylinder, a cylinder head having a primary combustion chamber communicating with said cylinder, said cylinder head and piston constructed and cooperating together to provide an annular afterburning chamber of relatively less volume than the primary chamber and substantially circumferentially surrounding said primary chamber within the boundaries as defined by the cylinder wall, said afterburning chamber having its greatest height adjacent to the cylinder wall.

15. In an internal combustion engine of the sleeve valve type, a cylinder ported for intake and exhaust, sleeve valve means having intake and exhaust ports cooperating with said cylinder intake and exhaust ports, a piston operating within said cylinder, a cylinder head having a primary combustion chamber communicating with said cylinder, said cylinder head and piston constructed and cooperating together to provide an annular afterburning chamber of relatively less volume than the primary chamber and substantially circumferentially surrounding said primary chamber within the boundaries as defined by the cylinder wall, said afterburning chamber having a height less than the height of the primary combustion chamber.

16. In an internal combustion engine of the sleeve valve type, a cylinder ported for intake and exhaust, sleeve valve means having intake and exhaust ports cooperating with said cylinder intake and exhaust ports, a piston operating within said cylinder, a cylinder head having a primary combustion chamber communicating with said cylinder, said cylinder head and piston constructed and cooperating together to provide an annular afterburning chamber of relatively less volume than the primary chamber and substantially circumferentially surrounding said primary chamber within the boundaries as defined by the cylinder wall, said afterburning chamber having a height at least not greater than the greatest height of said cylinder intake and exhaust ports.

17. A sleeve valve engine structure having a cylinder head structure provided with radially spaced primary and afterburning combustion chambers, said afterburning chamber substantially encircling said primary chamber within the boundaries as defined by the cylinder wall.

18. A sleeve valve engine structure having a cylinder head structure provided with radially spaced primary and afterburning combustion chambers, said afterburning chamber extending circumferentially about said primary chamber through an included angle of more than 180 degrees and located within the boundaries as defined by the cylinder wall, and having its greatest height adjacent to said cylinder wall.

19. In an internal combustion engine, a cylinder ported for intake and exhaust, valve means for said intake and exhaust ports, and a cylinder head having a primary combustion chamber communicating with and located above the central portion of the cylinder and an annular afterburning combustion chamber carried by said cylinder head and concentrically arranged with respect to said primary combustion chamber, said afterburning chamber encircling said primary combustion chamber and outwardly bounded by the cylinder wall.

20. A sleeve valve internal combustion engine incorporating a cylinder ported for intake and exhaust, a cylinder head enclosing a primary combustion chamber above the piston and being recessed to form the upper boundary of an afterburning combustion chamber bounded by a sleeve valve and extending around said primary combustion chamber, said piston in its outermost limit of travel closely approaching said cylinder head to provide restricted communication between said primary combustion chamber and said afterburning chamber.

21. A sleeve valve internal combustion engine as claimed in claim 20, in which the piston has a substantially flat face bounding said afterburning chamber.

22. A sleeve valve internal combustion engine as claimed in claim 20, in which the fuel mixture is caused to move inwardly from the afterburning chamber to the primary chamber through said restriction by outward piston movement just prior to igniting the fuel mixture in the primary chamber.

23. A sleeve valve internal combustion engine incorporating a cylinder ported for fuel mixture intake and exhaust, a cylinder head structure depending within a sleeve valve to provide upper boundaries of a primary combustion chamber and a surrounding secondary combustion chamber, a piston forming lower boundaries for said chambers, said sleeve valve forming the side wall of the afterburning chamber, said chambers arranged so that as the piston moves to its outer limit during compression it closely approaches the cylinder head structure intermediate said chambers and causes inward flow of fuel mixture to said primary chamber.

In testimony whereof I affix my signature.

ANDRE J. MEYER.